(12) United States Patent
Timken (10) Patent No.: US 11,359,147 B2
(45) Date of Patent: *Jun. 14, 2022

(54) CIRCULAR ECONOMY FOR PLASTIC WASTE TO POLYPROPYLENE VIA OIL REFINERY WITH FILTERING AND METAL OXIDE TREATMENT OF PYROLYSIS OIL

(71) Applicant: Chevron U.S.A. Inc., San Ramon, CA (US)

(72) Inventor: Hye-Kyung Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,633

(22) Filed: Apr. 22, 2021

(65) Prior Publication Data

US 2021/0332300 A1    Oct. 28, 2021

Related U.S. Application Data

(60) Provisional application No. 63/014,013, filed on Apr. 22, 2020.

(51) Int. Cl.
    *C10B 53/07*      (2006.01)
    *C10G 31/06*      (2006.01)
    (Continued)

(52) U.S. Cl.
    CPC .............. *C10B 53/07* (2013.01); *C10G 31/06* (2013.01); *C10G 31/09* (2013.01); *C10G 45/26* (2013.01);
    (Continued)

(58) Field of Classification Search
    CPC ........ C10B 53/07; C10G 31/06; C10G 31/09; C10G 45/26; C10G 2300/1003;
    (Continued)

(56) References Cited

U.S. PATENT DOCUMENTS 3,845,157 A    10/1974   Woo et al.
4,642,401 A    2/1987    Coenen et al.
(Continued)

FOREIGN PATENT DOCUMENTS

EP      0620264 A2    10/1994

OTHER PUBLICATIONS

International Search Report and Written Opinion from PCT/US2021/028642 dated Jul. 7, 2021.

*Primary Examiner* — Ali Z Fadhel
(74) *Attorney, Agent, or Firm* — E. Joseph Gess; Melissa M. Hayworth; Terrence M. Flaherty (57) ABSTRACT

Provided in one embodiment is a continuous process for converting waste plastic comprising polyethylene and/or polypropylene into recycle for polypropylene polymerization. The process comprises selecting waste plastics containing polyethylene, polypropylene, or a mixture thereof, and passing the waste plastics through a pyrolysis reactor to thermally crack at least a portion of the polyolefin waste and produce a pyrolyzed effluent. The pyrolyzed effluent is separated into offgas, a pyrolysis oil comprising a naphtha, diesel and heavy fractions, and char. The pyrolysis oil, or at least a fraction, is passed to a filtration/metal oxide treatment, with the treated product passed to a refinery FCC unit. A liquid petroleum gas $C_3$ olefin/paraffin mixture fraction is recovered from the FCC unit, as well as a $C_4$ olefin/paraffin mixture fraction. The $C_3$ olefin fraction can be passed to a propylene polymerization reactor, and the $C_3$ paraffin passed to a dehydrogenation unit to produce propylene for further polymerization.

51 Claims, 4 Drawing Sheets

Filtration and Metal Oxide Treatment at Pyrolysis Production Facility for Waste Plastics Pyrolysis Oil for Refinery Unit Co-Feeding (51) Int. Cl.
*C10G 31/09* (2006.01)
*C10G 45/26* (2006.01)

(52) U.S. Cl.
CPC ............... *C10G 2300/1003* (2013.01); *C10G 2400/04* (2013.01); *C10G 2400/20* (2013.01)

(58) Field of Classification Search
CPC ............ C10G 2400/04; C10G 2400/20; C10G 1/002; C10G 1/10; C10G 25/003; C10G 55/06; C08J 2323/06; C08J 2323/12; C08J 11/12; C08F 10/06; Y02P 20/143
See application file for complete search history.

(56) References Cited

U.S. PATENT DOCUMENTS

| | | | |
|---|---|---|---|
| 5,849,964 A | 12/1998 | Holighaus et al. | |
| 5,981,818 A | 11/1999 | Purvis | |
| 6,143,940 A | 11/2000 | Miller et al. | |
| 6,150,577 A | 11/2000 | Miller et al. | |
| 6,288,296 B1 | 9/2001 | Miller et al. | |
| 6,774,272 B2 | 8/2004 | Miller | |
| 6,822,126 B2 | 11/2004 | Miller | |
| 7,834,226 B2 | 11/2010 | Miller | |
| 8,088,961 B2 | 1/2012 | Miller | |
| 8,404,912 B1 | 3/2013 | Miller | |
| 8,480,880 B2 | 7/2013 | Miller | |
| 8,696,994 B2 | 4/2014 | Miller | |
| 9,212,318 B2 | 12/2015 | Narayanaswamy et al. | |
| 2007/0238912 A1 | 10/2007 | Smith, Jr. | |
| 2011/0171114 A1* | 7/2011 | Shaw | C08J 11/12 423/566.1 |
| 2012/0152801 A1* | 6/2012 | Bozzano | C10G 3/46 208/264 |
| 2014/0020286 A1* | 1/2014 | Doucet | C10K 3/02 585/16 |
| 2016/0264885 A1 | 9/2016 | Narayanaswamy et al. | |
| 2016/0312125 A1* | 10/2016 | Linck | C10G 1/06 |
| 2016/0362609 A1 | 12/2016 | Ward et al. | |
| 2018/0245000 A1 | 8/2018 | Urade et al. | |
| 2018/0346820 A1* | 12/2018 | Chilkoor Soundararajan | C10G 45/10 |
| 2019/0093019 A1 | 3/2019 | Levine et al. | |
| 2019/0161683 A1 | 5/2019 | Narayanaswamy et al. | |
| 2019/0367428 A1 | 12/2019 | Ramamurthy et al. | |
| 2021/0130699 A1 | 5/2021 | Bitting | |
| 2021/0189248 A1 | 6/2021 | Timken | |
| 2021/0189250 A1 | 6/2021 | Timken | |
| 2021/0189251 A1 | 6/2021 | Timken | |
| 2021/0189252 A1 | 6/2021 | Timken | |
| 2021/0189253 A1 | 6/2021 | Timken | |
| 2021/0189254 A1 | 6/2021 | Timken | |
| 2021/0189269 A1 | 6/2021 | Timken | |
| 2021/0332299 A1* | 10/2021 | Timken | C10G 55/06 |

* cited by examiner

Figure 1
Pyrolysis of Waste Plastics to Fuel or Wax

Figure 2
Filtration and Metal Oxide Treatment at Pyrolysis Production Facility for Waste Plastics Pyrolysis Oil for Refinery Unit Co-Feeding Figure 3
Upgrading of Pyrolysis Products from Waste Plastics for Refinery Unit Co-Feeding for Establishment of Circular Economy for PE Recycle Figure 4
Plastic Type Classification for Waste Plastics Recycling

CIRCULAR ECONOMY FOR PLASTIC WASTE TO POLYPROPYLENE VIA OIL REFINERY WITH FILTERING AND METAL OXIDE TREATMENT OF PYROLYSIS OIL

The present application claims priority to U.S. Provisional Patent Application No. 63/014,013, filed Apr. 22, 2020, the contents of which are hereby incorporated by reference in their entirety.

BACKGROUND

The world has seen extremely rapid growth of plastics production. According to PlasticsEurope Market Research Group, the world plastics production was 335 million tons in 2016, 348 million tons in 2017 and 359 million tons in 2018. According to McKinsey & Company, the global plastics-waste volume was estimated about 260 million tons per year in 2016, and projected to be 460 million tons per year by 2030 if the current trajectory continues.

Single use plastic waste has become an increasingly important environmental issue. At the moment, there appear to be few options for recycling polyethylene and polypropylene waste plastics to value-added chemical and fuel products. Currently, only a small amount of polyethylene and polypropylene is recycled via chemical recycling, where recycled and cleaned polymer pellets are pyrolyzed in a pyrolysis unit to make fuels (naphtha, diesel), steam cracker feed or slack wax.

Processes are known which convert waste plastic into hydrocarbon lubricants. For example, U.S. Pat. No. 3,845,157 discloses cracking of waste or virgin polyolefins to form gaseous products such as ethylene/olefin copolymers which are further processed to produce synthetic hydrocarbon lubricants. U.S. Pat. No. 4,642,401 discloses the production of liquid hydrocarbons by heating pulverized polyolefin waste at temperatures of 150-500° C. and pressures of 20-300 bars (2-30 MPa). U.S. Pat. No. 5,849,964 discloses a process in which waste plastic materials are depolymerized into a volatile phase and a liquid phase. The volatile phase is separated into a gaseous phase and a condensate. The liquid phase, the condensate and the gaseous phase are refined into liquid fuel components using standard refining techniques. U.S. Pat. No. 6,143,940 discloses a procedure for converting waste plastics into heavy wax compositions. U.S. Pat. No. 6,150,577 discloses a process of converting waste plastics into lubricating oils. EP0620264 discloses a process for producing lubricating oils from waste or virgin polyolefins by thermally cracking the waste in a fluidized bed to form a waxy product, optionally using a hydrotreatment, then catalytically isomerizing and fractionating to recover a lubricating oil.

Other documents which relate to processes for converting waste plastic into lubricating oils include U.S. Pat. Nos. 6,288,296; 6,774,272; 6,822,126; 7,834,226; 8,088,961; 8,404,912; and 8,696,994; and U.S. Patent Publication Nos. 2019/0161683; 2016/0362609; and 2016/0264885. The foregoing patent documents are incorporated herein by reference in their entirety.

The current method of chemical recycling via pyrolysis cannot make a big impact for the plastics industry. The current pyrolysis operation produces poor quality fuel components (naphtha and diesel range products), but the quantity is small enough that these products can be blended into fuel supplies. However, this simple blending cannot continue if very large volumes of waste polyethylene and polypropylene are to be recycled to address environmental issues. The products as produced from a pyrolysis unit are of too poor quality to be blended in large amounts (for example 5-20 vol. % blending) in transportation fuels.

In order to achieve recycling of single use plastics in an industrially significant quantity to reduce its environmental impact, more robust processes are needed. The improved processes should establish "circular economy" for the waste polyethylene and polypropylene plastics where the spent waste plastics are recycled effectively back as starting materials for polymers and high value byproducts.

SUMMARY

Provided is a continuous process for converting waste plastic into recycle for polypropylene polymerization. The process comprises selecting waste plastics containing polyethylene and/or polypropylene. These waste plastics are then passed through a pyrolysis reactor to thermally crack at least a portion of the polyolefin waste and produce a pyrolyzed effluent. The pyrolyzed effluent is separated into offgas, a pyrolysis oil comprising naphtha, diesel and heavy fractions, and char. Pyrolysis wax can also be produced in addition to the pyrolysis oil.

The incorporation of the process with an oil refinery is an important aspect of the present process, and allows the creation of a circular economy with a single use waste plastic such as polyethylene or polypropylene. Thus, the pyrolysis oil, for example, the entire liquid fraction from the pyrolysis unit, is passed to a refinery FCC unit from which can be recovered liquid petroleum olefin streams. A $C_3$ olefin stream from the FCC unit can be isolated and passed to a propylene polymerization unit.

Another important aspect of the present process is the upgrading of the liquid pyrolysis product before the stream is integrated with a refinery unit. The pyrolysis oil and wax waste plastics contain contaminants that cannot be fed in a large quantity to refinery units, such as an FCC unit, as they deactivate the refining catalysts, cause plugging in the unit or cause corrosion in processing units, which are commonly made of carbon steel. The use of fine filtration followed by a metal oxide treatment has been found to be an effective treatment process to upgrade the pyrolysis products for then safely processing in refinery units. The use of the fine filtration and metal oxide treatment allows effective recycling in large volumes when integrated with a refinery.

In another embodiment, a continuous process for converting waste plastic comprising polyethylene and polypropylene into recycle for polypropylene polymerization is provided. The process comprises selecting waste plastics containing polyethylene and/or polypropylene and then passing the waste plastics through a pyrolysis reactor to thermally crack at least a portion of the polyolefin waste and produce a pyrolyzed effluent. The pyrolyzed effluent is separated into offgas, a pyrolysis oil comprising naphtha, diesel and heavy fractions, and char. The pyrolysis oil, the entire liquid fraction from the pyrolysis unit, is subjected to a fine filtration and then a metal oxide treatment. The resulting treated pyrolysis product is then safely passed to a refinery FCC unit. The FCC unit will convert the treated pyrolysis oil product into FCC hydrocarbon product. The FCC product is sent to a FCC unit separation section to produce offgas, $C_3$, $C_4$, FCC gasoline and heavy fractions. $C_4$ is separated from the mixture to leave a $C_3$ olefin/paraffin mixture, which mixture is separated into $C_3$ paraffin and $C_3$ olefin fractions. The $C_3$ olefin is passed to a propylene polymerization reactor. Optionally, the $C_3$ paraffin is passed to a dehydrogenation unit to produce propylene for subsequent polymerization to polypropylene.

The FCC gasoline recovered is sent to a gasoline blending pool. The heavy portion of the hydrocarbon from the FCC unit distillation is sent to appropriate refinery units for upgrading into clean gasoline and diesel. The $C_4$ LPG fraction recovered contains butanes and butenes and can also be sent to various upgrading processes to make clean gasoline and diesel.

In one embodiment, the treated pyrolysis oil is passed to a refinery FCC Feed Pretreater Unit prior to the FCC unit. This unit is effective in removing sulfur, nitrogen, phosphorus, silica, dienes and metals that will hurt a FCC unit catalyst performance. Also this unit hydrogenates aromatics and improves the liquid yield of the FCC unit.

Among other factors, it has been found that by adding refinery operations one can upgrade the waste pyrolysis oil (and wax) to higher value products such as gasoline, diesel, and base oil. Also, by adding refinery operations it has been found that clean naphtha ($C_5$-$C_8$) or $C_4$ or $C_3$ can be efficiently and effectively produced from the waste pyrolysis oil for ultimate polypropylene polymer production. Positive economics are realized for the overall process from recycled plastics to a polypropylene product with product quality identical to that of virgin polymer. It has been further discovered that a most effective process is achieved upon upgrading the pyrolysis oil prior to integration into the refinery operation. Utilizing a combination of fine filtration with a metal oxide treatment has been found most effective. Such filtration/metal oxide treatments of the pyrolysis oil safely allows much larger volumes of waste plastic recycle.

DETAILED DESCRIPTION

In the present process, provided is a method to recycle waste polyethylene and/or polypropylene back to virgin polypropylene and establish a circular economy by combining distinct industrial processes. A substantial portion of polyethylene and polypropylene polymers are used in single use plastics and get discarded after its use. The single use plastic waste has become an increasingly important environmental issue. At the moment, there appear to be few options for recycling polyethylene and polypropylene waste plastics to value-added chemicals and fuel products. Currently, only a small amount of polyethylene/polypropylene is recycled via chemical recycling, where recycled and cleaned polymer pellets are pyrolyzed in a pyrolysis unit to make fuels (naphtha, diesel), steam cracker feed or slack wax.

Polypropylene is the second-most widely produced commodity plastic after polyethylene, with about 60 million ton per year being globally produced. It is used widely in various consumer and industrial products such as in packaging (rugged reusable containers and bottles, clear bags or clear containers), labeling, pipe, fibers, foams, clothing etc. Polypropylene has properties similar to polyethylene, but it is slightly harder and more heat resistant, and has higher chemical resistance. The industrial manufacturing processes can be grouped into gas phase polymerization, bulk polymerization and slurry polymerization. All state-of-the-art processes use either gas-phase or bulk reactor systems at 60 to 80° C. The properties of polypropylene (0.895 and 0.92 g/cm$^3$ density) are strongly affected by its tacticity, the orientation of the methyl groups relative to the methyl groups in neighboring monomer units. The tacticity of polypropylene (isotactic polypropylene, syndiotactic polypropylene, atactic polypropylene) can be chosen by the choice of an appropriate Ziegler-Nana or metallocene organometallic catalyst.

Today, only a small portion of spent polyethylene and polypropylene products are collected for recycling efforts due to the inefficiencies discussed above. The present process allows larger volumes of single use plastic waste to be safely recycled by using a process integrated with a refinery. A circular economy is effectively established by the present process.

Figure 1:
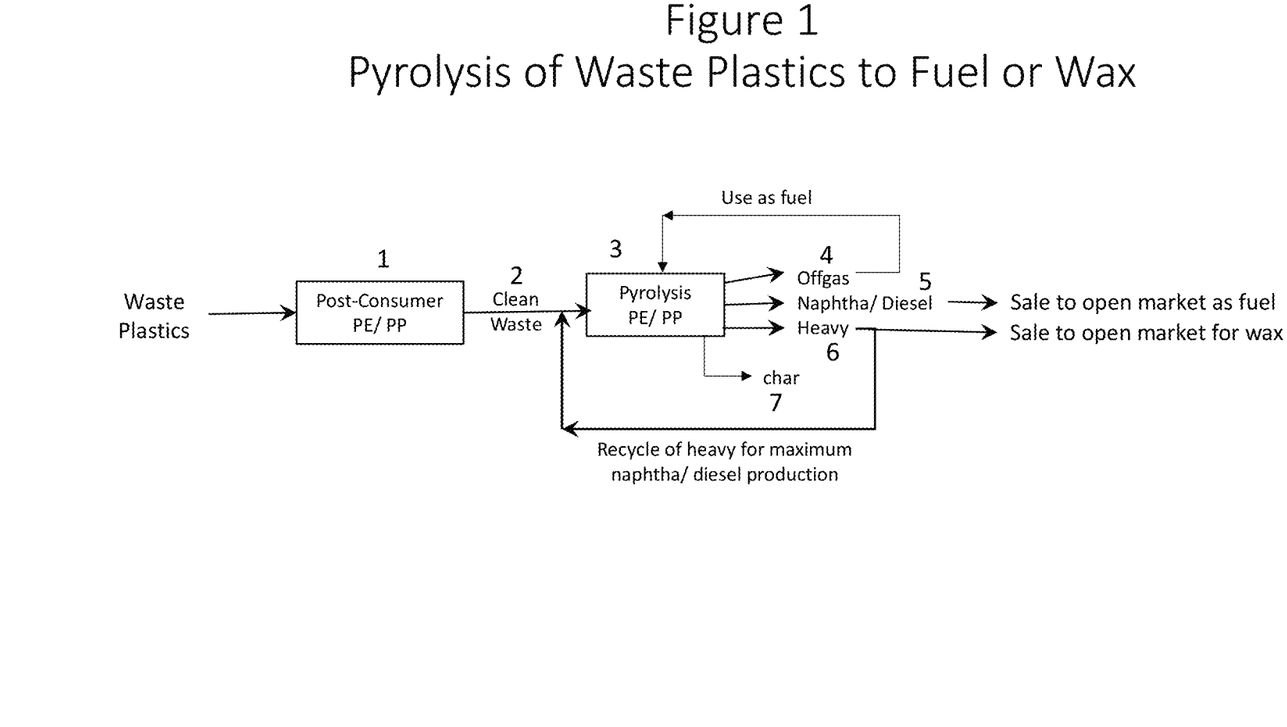
FIG. 1 depicts the current practice of pyrolyzing waste plastics to produce fuel or wax (base case).

FIG. 1 shows a diagram of pyrolysis of waste plastics fuel or wax that is generally operated in the industry today. As noted above, generally, polyethylene and polypropylene wastes are sorted together 1. The cleaned polyethylene/polypropylene waste 2 is converted in a pyrolysis unit 3 to offgas 4 and pyrolysis oil (liquid product). The offgas 4 from the pyrolysis unit is used as fuel to operate the pyrolysis unit. A distillation unit in the pyrolysis unit separates the pyrolysis oil to produce naphtha and diesel 5 products which are sold to fuel markets. The heavy pyrolysis oil fraction 6 is recycled back to the pyrolysis unit 3 to maximize the fuel yield. Char 7 is removed from the pyrolysis unit 3. The heavy fraction 6 is rich in long chain, linear hydrocarbons, and is very waxy (i.e., forms paraffinic wax upon cooling to ambient temperature). Wax can be separated from the heavy fraction 6 and sold to the wax markets.

It has been discovered that an upgrading of the pyrolysis oil prior to introduction into refinery units improves the effectiveness and safety of the overall process. More specifically, critical materials that need to be removed from the pyrolysis products for co-feeding to a refinery unit includes components such as residual char, metals and chlorides. Pyrolysis products with these impurities cannot be fed in large quantity to refinery units as chars and inorganic solids will cause plugging in the unit, metals will deactivate the refining catalysts permanently and chlorides will cause corrosion in processing equipment. Reduction of chloride impurity is particularly important prior to feeding to refinery units as chlorides may cause severe corrosion on bare carbon steel with which most of refinery units are constructed. The chloride induced corrosion will be particularly accelerated at elevated temperatures above 500° F. (260° C.), where most of refinery units are operating.

The pyrolysis product treatment of the present process can be done efficiently in conjunction with the pyrolysis unit during the pyrolysis oil and wax manufacturing. Or the treatment can be done at the refinery before feeding the pyrolysis oil and wax to the refinery units. The present fine filtration and metal oxide treatment process does not reduce S and N impurities, nor olefin and diene contents. In the present process for circular economy establishment, conversion of these compounds are effectively achieved by refinery units such as a fluid catalytic cracking (FCC) unit, a FCC feed pretreater, refinery crude unit, coker, distillate hydrotreater or hydrocracker.

The present process converts pyrolyzed polyethylene and/or polypropylene waste plastic in large quantities by integrating the waste polymer pyrolysis product streams into an oil refinery operation. The resulting processes produce the feedstocks for the polymers (naphtha or $C_3$-$C_4$ or $C_3$ only for a propylene polymerization unit), high quality gasoline, jet and diesel fuel, and/or quality base oil.

Generally, the present process provides a circular economy for polypropylene plants. Polypropylene is produced via polymerization of pure propylene.

By adding refinery operations to upgrade the waste pyrolysis oil to higher value products (gasoline and diesel, base oil) and to produce clean LPG for ultimate polypropylene polymer production, one is able to create positive economics for the overall process from recycled plastics to polypropylene product with quality identical to that of the virgin polymer.

A pyrolysis unit produces poor quality products containing contaminants, such as calcium, magnesium, chlorides, nitrogen, sulfur, phosphorus, silicon, dienes, and heavy components, which products cannot be used in large quantity for blending in transportation fuels. It has been discovered that by having these products go through the refinery units, the contaminants can be captured in pre-treating units and their negative impacts diminished. The fuel components can be further upgraded with appropriate refinery units with chemical conversion processes, with the final transportation fuels produced by the integrated process being of higher quality and meeting the fuels quality requirements. The present process will upgrade the wax into valuable gasoline, diesel and base oil. The integrated process will generate a much cleaner $C_3$ for propylene generation and polypropylene production. These large on-spec productions allow "cyclical economy" for the recycle plastics feasible.

However, it has been discovered, and is an important aspect of the present process, that upgrading of the pyrolysis product is still needed before the stream is integrated with a refinery unit. The pyrolysis oil and wax waste plastics contain contaminants that cannot be fed in large quantity to a refinery units as they deactivate the refining catalysts or cause plugging in the unit or cause severe corrosion in processing units which are commonly made of bare carbon steel.

Figure 2:
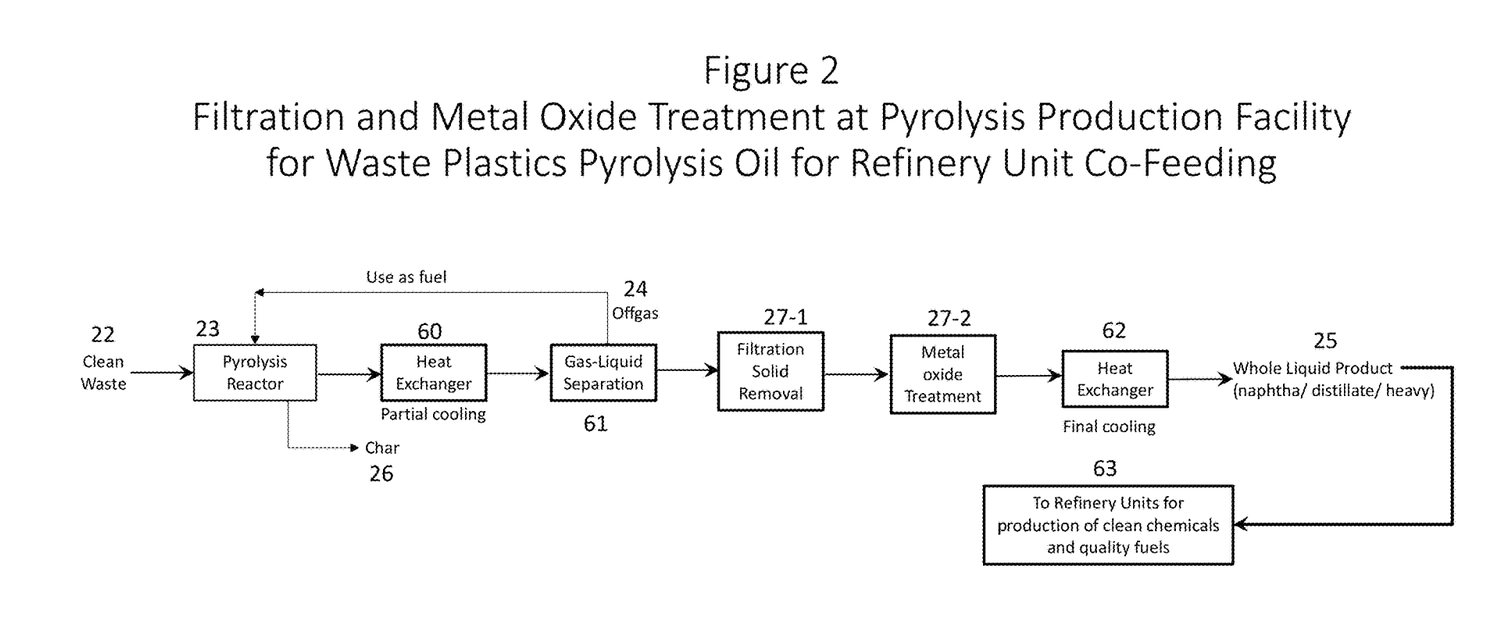
FIG. 2 depicts a present process for filtration/metal oxide treatment of pyrolysis oil at the pyrolysis facility.

FIG. 2 depicts a process sequence of a fine filtration and metal oxide treatment. In FIG. 2, the cleaned polyethylene/polypropylene waste 22 is passed through a pyrolysis reactor 23 to thermally crack at least a portion of the polyolefin waste and produce a pyrolyzed effluent. Char 26 is generally removed from the pyrolysis reactor 23. The effluent is passed through a heat exchanger 60 for partial cooling and then to a gas-liquid separation unit 61. Offgas 24 can be used as fuel to operate the pyrolysis unit. The liquid product from the pyrolysis effluent is then passed to a fine filtration unit 27-1. Optionally, any pyrolysis wax produced can also be passed to the fine filtration (and metal oxide treatment).

The fine filtration unit removes solids in the pyrolysis oil, particularly chars created by the pyrolysis process and inorganic solids arising from contamination. Metals are often present as inorganic solids in the form of metal chlorides, metals or metal oxides. Thus, the fine filtration process reduces the contaminants coming from chars, metals, metal oxides, and metal chlorides. A very fine filter medium needs to be used, preferentially less than 5 micron, more preferentially less than 2.5 micron and most preferentially less than 1 micron nominal-rated filter. Multiple filter units with different size filter elements may be used in series. These filter media are well known for industrial uses. The filter media must be able to withstand the temperature of the pyrolysis oil as well as the chemical nature of especially the contaminants. The residual solid content can be measured, for example, by Heptane Insolubles test, ASTM D-3279 method. The content of Heptane Insolubles needs to be reduced to less than 0.5 wt %, preferably less than 0.1%.

After the filtration, the filtered liquid effluent is passed to a metal oxide treatment 27-2. The metal oxide treatment removes organic chlorides and metals from the filtered pyrolysis oil. The chloride and impurity removal is more effective when the metal oxide treatment temperature is done above 200° F. (93° C.), preferentially above 300° F. (149° C.), and most preferentially above 400° F. (204° C.). Preferred pressure range is from atmospheric pressure to 1000 psig, preferentially from 0 psig to 600 psig. To reduce fouling of metal oxide and to improve the performance, optionally $H_2$ gas may be added to the treating process. The preferred amount of $H_2$ gas flow is ranging from 0 to 2000 scf/bbl of pyrolysis oil. Metal oxides with high surface area can also capture additional contaminants. Metal oxides such as Cao, ZnO, MgO, alumina, silica, clay and silica-alumina are effective for chloride removal. Mixed metal oxides made of Mg, Ca, Al or Zn, or combination of these are particularly effective for organic chloride removal. It is desirable to reduce the chloride content to less than 10 ppm, preferably less than 5 ppm and most preferably less than 1 ppm. Metal oxides made of Ni, Mo, phosphate, alumina, silica and silica-alumina or combination of these are particularly effective for residual metals removal while they can also remove other contaminants such as chlorides, nitrogen, phosphorus and silicon. It is desirable to reduce the total residual metals content to less than 10 ppm, preferably less than 5 ppm. Combination of different metal oxides can be used for effective removal of impurities.

The treated effluent can then be cooled in heat exchanger 62, with the entire treated, liquid product (naphtha, distillate and heavy fraction) 25 then passed on to refinery units 63.

The pyrolysis unit can be located near the waste plastics collection site, which site could be away from a refinery, near a refinery, or within a refinery. If the pyrolysis unit is located away from the refinery, then pyrolysis oil (naphtha/diesel and heavies) can be transferred to the refinery by truck, barge, rail car or pipeline. It is preferred, however, that the pyrolysis unit is within the waste plastics collection site or within the refinery.

Figure 3:
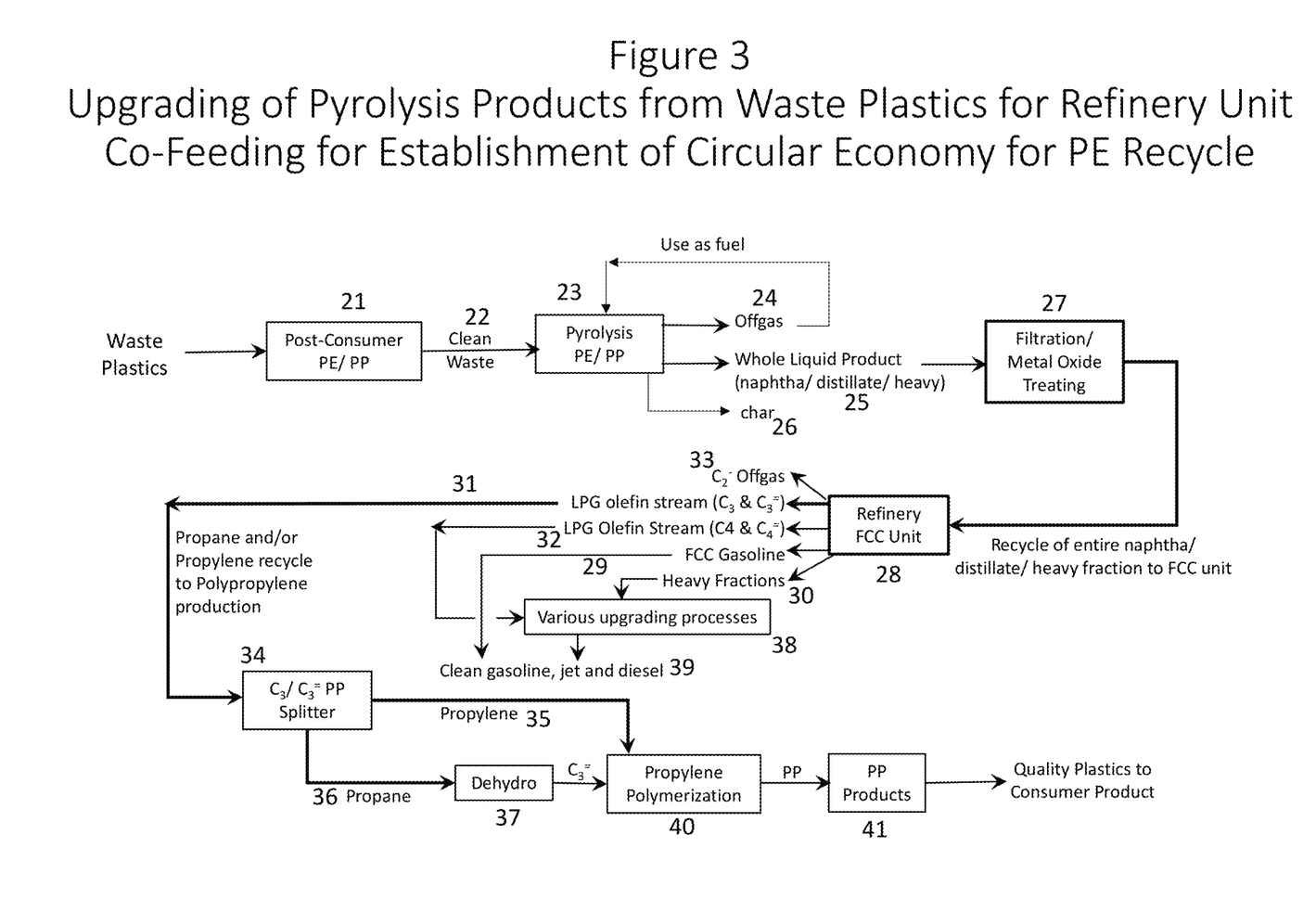
FIG. 3 depicts a present process for establishing a circular economy for waste plastics to recycled polypropylene in accordance with the present processes including filtration/metal oxide treatment of pyrolysis oil occurring in a refinery.

In FIG. 3, a fine filtration and metal oxide treatment 27 is effected at the pyrolysis facility. The whole liquid pyrolysis product 25 from the pyrolysis unit 23 is sent to the filtration unit followed by an oxide treatment. It is preferred that the hot pyrolysis liquid is filtered and treated with the metal oxide before it is completely cooled to ambient temperature for storage and/or transfer. Thus, it is preferred for the filtration and metal oxide treatment to occur at the pyrolysis facility after the whole liquid product 25 is recovered or to occur simultaneously with the whole liquid product collection step. The treated liquid product can then be transferred to the refinery. In another embodiment, the whole liquid product 25 can be transferred to a refinery and the fine filtration and metal oxide treatment 27 is completed at the refinery.

Figure 4:
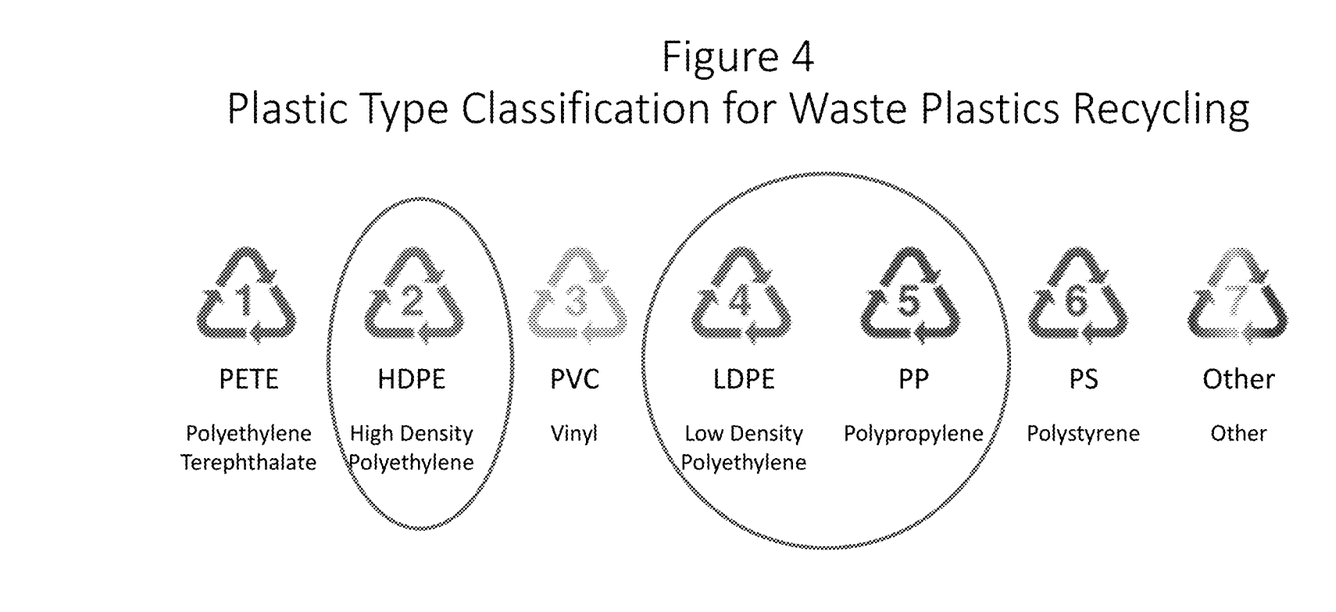
FIG. 4 depicts the plastic type classification for waste plastics recycling.

The preferred starting material for the present process is sorted waste plastics containing predominantly polyethylene and polypropylene (plastics recycle classification types 2, 4, and 5). The pre-sorted waste plastics are washed and shredded or pelleted to feed to a pyrolysis unit for thermal cracking. FIG. 4 depicts the plastic type classification for waste plastics recycling. Classification types 2, 4, and 5 are high density polyethylene, low density polyethylene and polypropylene, respectively. Any combination of the polyethylene and polypropylene waste plastics can be used. For the present process, at least some polyethylene waste plastic is preferred.

Proper sorting of waste plastics is very important in order to minimize contaminants such as N, Cl, and S. Plastics waste containing polyethylene terephthalate (plastics recycle classification type 1), polyvinyl chloride (plastics recycle classification type 3) and other polymers (plastics recycle classification type 7) need to be sorted out to less than 5%, preferably less than 1% and most preferably less than 0.1%. The present process can tolerate a moderate amount of polystyrene (plastics recycle classification type 6). Waste polystyrene needs to be sorted out to less than 30%, preferably less than 20% and most preferably less than 5%.

Washing of waste plastics removes metal contaminants such as sodium, calcium, magnesium, aluminum, and non-metal contaminants coming from other waste sources. Non-metal contaminants include contaminants coming from the Periodic Table Group IVA, such as silica, contaminants from Group VA, such as phosphorus and nitrogen compounds, contaminants from Group VIA, such as sulfur compounds, and halide contaminants from Group VIIA, such as fluoride, chloride, and iodide. The residual metals, non-metal contaminants, and halides need to be removed to less than 50 ppm, preferentially less than 30 ppm and most preferentially to less than 5 ppm.

The pyrolyzing is carried out by contacting a plastic material feedstock in a pyrolysis zone at pyrolysis conditions, where at least a portion of the feed(s) is cracked, thus forming a pyrolysis zone effluent comprising primarily 1-olefins and n-paraffins. Pyrolysis conditions include a temperature of from about 400° C. to about 700° C., preferably from about 450° C. to about 650° C. Conventional pyrolysis technology teaches operating conditions of above-atmospheric pressures. See e.g., U.S. Pat. No. 4,642,401. Additionally, it has been discovered that by adjusting the pressure downward, the yield of a desired product can be controlled. See, e.g., U.S. Pat. No. 6,150,577. Accordingly, in some embodiments where such control is desired, the pyrolysis pressure is sub-atmospheric.

It has been discovered that the use of the fine filtration followed by the metal oxide treatment is vital to achieving a feed stream that can be passed efficiently through a refinery without causing problems such as corrosion, plugging or deactivation of catalysts. By fine filtration is meant a filter having a pore size of 5.0 micron or less, preferably 1.0 micron or less, and in one embodiment about 0.5 micron. The treatment thereby allows large amounts of the waste plastic pyrolysis liquid product to be passed through the refinery for a most effective recycling process.

FIG. 3 shows the present integrated process, waste plastics pyrolysis, the filtering and metal oxide treatment, and the integrating refinery operations with recycle for effective polypropylene production. The same numbers in FIG. 2 and FIG. 3 refer to the same type of units and product streams. The cleaned waste plastic 22 is converted in a pyrolysis unit 23 to offgas 24 and a pyrolysis oil (liquid product). The offgas 24 from the pyrolysis unit can be used as fuel to operate the pyrolysis unit 23. The pyrolysis oil, the entire liquid product 25, comprises the naphtha, diesel distillates and heavy fractions. Char 26 is removed from the pyrolysis unit 23 after completion of the pyrolysis step. The entire pyrolysis oil (naphtha, distillate and heavy fractions) 25 is passed through filtering and metal oxide treatment 27, and then sent to a fluid catalytic cracking (FCC) unit 28. Optionally, only a portion of pyrolysis oil (the distillate and heavy fractions only or the heavy fraction only) can be sent to the FCC unit.

The fluid catalytic cracking (FCC) process is widely used in the refining industry for conversion of atmospheric gas oil, vacuum gas oil, atmospheric residues and heavy stocks recovered from other refinery operations into high-octane gasoline, light fuel oil, heavy fuel oil, olefin-rich light gas (LPG) and coke. FCC uses a high activity zeolite catalyst to crack the heavy hydrocarbon molecules at a 950-990° F. (510-532° C.) reactor temperature in a riser with a short contact time of a few minutes or less. LPG streams containing olefins (propylene, butylene) are commonly upgraded to make alkylate gasoline, or to be used in chemicals manufacturing. A conventional FCC unit is used.

Cracking of the pyrolysis liquid oil combined with petroleum derived oil in the FCC unit produces liquefied petroleum gas (LPG) olefin streams 31 and 32, as well as a gasoline 29 and heavy fraction 30. A $C_2^-$ offgas 33 is also produced.

The refinery will generally have its own hydrocarbon feed from petroleum derived oil flowing through the refinery units. The flow volume of pyrolysis oil generated from the pyrolysis of waste plastic to the refinery units can comprise any practical or accommodating volume % of the total flow to the refinery units. Generally, the flow of the pyrolysis oil (and wax) generated from the waste plastic pyrolysis, for practical reasons, can be up to about 50 vol. % of the total flow, i.e., the refinery flow and the pyrolysis flow. In one embodiment, the flow of the pyrolysis oil is an amount up to about 20 vol. % of the total flow. In another embodiment, the flow of the pyrolysis oil is an amount up to about 10 vol. % of the total flow. About 20 vol. % has been found to be an amount that is quite practical in its impact on the refinery while also providing excellent results and being an amount that can be accommodated. The amount of pyrolysis oil and wax generated from the pyrolysis can of course be controlled so that the fraction passed to the refinery units provide the desired volume % of the flow.

The LPG olefin stream 31 is a $C_3$ liquid petroleum gas (LPG) fraction containing propane and propylene. The $C_3$ stream of propane and propylene mix is separated by a propane/propylene splitter (PP splitter) 34 to produce pure streams of propylene 35 and propane 36. The propylene stream 35 can be fed directly to the polypropylene polymerization unit 40.

The pure propane may be fed to a propane dehydrogenation unit 37 to make propylene 35, and then ultimately polypropylene in a propylene polymerization unit 40. Dehydrogenation of propane is practiced widely in the industry to produce propylene. The reaction is endothermic, conversion is maintained by multi-stage reactors and inter-stage heaters. The unit typically operates at high temperature (>900° F.) and low pressure (<50 psig) in the presence of noble metal (Pt) catalyst. The multi-stage process generates approximately 85% purity propylene/propane mixture. This stream is directed to a propane-propylene (P-P) splitter which is a high efficiency distillation column. The splitter produces pure propylene stream with 99.5-99.8% purity.

The LPG olefin stream 32 is a $C_4$ liquid petroleum gas (LPG) fraction containing butanes and butenes. This fraction may be sent to a refinery alkylation unit (not shown) or upgraded or blended into gasoline.

The FCC gasoline 29 can be sent to a gasoline blending pool. The heavy portion 30 recovered from the FCC unit 28 is sent to appropriate refinery units 38 (such as hydrotreating, hydrocracking and/or coker units) for upgrading into clean gasoline and diesel 39. The $C_4$ stream 32 is either sent to a gasoline blending pool or further upgraded (via processes such as alkylation or $C_4$ olefin dimerization or ether synthesis) into clean gasoline.

The polypropylene polymer made in the propylene polymerization unit 40, can then be made into consumer products 41.

The propylene polymerization unit is preferably located near the refinery so that the feedstocks (propane and propylene) can be transferred via pipeline. For a petrochemical plant located away from the refinery, the feedstock can be delivered via truck, barge, rail car or pipeline.

In another embodiment, the treated pyrolysis oil is first sent to an FCC feed pretreater (not shown) before the FCC unit. The FCC feed pretreater typically uses a bimetallic (NiMo or CoMo) alumina catalyst in a fixed bed reactor to hydrogenate the feed with $H_2$ gas flow at a 660-780° F. (349-415° C.) reactor temperature and 1,000-2,000 psi (6.89-13.79 MPa) pressure. The refinery FCC feed pretreater unit is effective in removing sulfur, nitrogen, phosphorus, silica, dienes and metals that will hurt the FCC unit catalyst performance. Also this unit hydrogenates aromatics and improves the liquid yield of the FCC unit.

The carbon in and out of the refinery operations are "transparent," meaning that all the molecules from the waste plastic do not necessarily end up in the exact olefin product cycled back to the polyolefin plants, but are nevertheless assumed as "credit" as the net "green" carbon in and out of the refinery is positive. With these integrated processes, the amount of virgin feeds needed for polyethylene plants will be reduced substantially.

The benefits of a circular economy and an effective and efficient recycling campaign are realized by the present integrated process. The use of the fine filtering and metal oxide treatment permits larger volumes of feed to be circulated safely and efficiently through the refinery.

The following non-limiting examples are illustrative of the present process and its benefits.

EXAMPLE 1

Properties of Pyrolysis Oil and Wax from Commercial Sources

Pyrolysis oil and wax samples were obtained from commercial sources and their properties are summarized in Table 1. These pyrolysis samples were prepared from waste plastics containing mostly polyethylene and polypropylene via thermal decomposition in a pyrolysis reactor at around 400-600° C., near atmospheric pressure without any added gas or a catalyst. A pyrolysis unit typically produces gas, liquid oil product, optionally wax product, and char. The pyrolysis unit's overhead gas stream containing thermally cracked hydrocarbon was cooled to collect condensate as pyrolysis oil (liquid at ambient temperature) and/or pyrolysis wax (solid at ambient temperature). The pyrolysis oil is the main product of the pyrolysis units. Some units produce pyrolysis wax as a separate product in addition to the pyrolysis oil.

TABLE 1

Properties of As-Received Oil and Wax from Pyrolysis of Waste Plastics

|  | Pyrolysis Oil Sample A | Pyrolysis Oil Sample B | Pyrolysis Oil Sample C | Pyrolysis Oil Sample D | Pyrolysis Wax Sample E |
|---|---|---|---|---|---|
| Specific Gravity at 60° F. | 0.814 | 0.820 | 0.774 | — | 0.828 |
| Simulated Distillation, ° F. | | | | | |
| 0.5% (Initial Boiling Point) | 87 | 299 | 18 | 86 | 325 |
| 5% | 179 | 306 | 129 | 154 | 475 |
| 10% | 214 | 309 | 156 | 210 | 545 |
| 30% | 322 | 346 | 285 | 304 | 656 |
| 50% | 421 | 447 | 392 | 421 | 733 |
| 70% | 545 | 585 | 517 | 532 | 798 |
| 90% | 696 | 798 | 663 | 676 | 894 |
| 95% | 772 | 883 | 735 | 743 | 939 |
| 99.5% (Final Boiling Point) | 942 | 1079 | 951 | 888 | 1064 |
| Carlo-Erba Hydrocarbon Analysis | | | | | |
| Carbon, wt % | 87.6 | 84.21 | 85.46 | 85.97 | 85.94 |
| Hydrogen, wt % | 12.7 | 12.25 | 14.1 | 14.0 | 14.15 |
| Sum of C + H, wt % | 100.3 | 96.46 | 99.5 | 100.0 | 100.1 |
| H/C Molar Ratio | 1.73 | 1.75 | 1.98 | 1.96 | 1.98 |
| Bromine Number, g/100 g | 49 | 60 | 40 | 44 | 14 |
| Hydrocarbon Type | | | | | |
| Total Aromatics, vol % | 23.3 | 22.8 | 5.1 | 8.7 | 13.3 |
| Total Olefins & Naphthenes, vol % | 39.0 | 50.2 | 42.4 | 38.2 | 42.1 |
| Total Paraffins, vol % | 37.7 | 27 | 52.5 | 53.1 | 44.6 |
| Contaminants | | | | | |
| Total S, ppm | 48 | 29 | 7.8 | 99 | 6.3 |
| Total N, ppm | 751 | 1410 | 318 | 353 | 237 |
| Total Cl, ppm (by CIC) | 113 | 62 | 41 | 70 | 4.7 |
| O in naphtha & distillate, ppm | 250 | — | 574 | — | — |
| Trace Elemental Impurities | | | | | |
| Al, ppm | <1.1 | <0.56 | 0.6 | <0.53 | <0.68 |
| Ca, ppm | 1.4 | 11.5 | <0.5 | <0.53 | <0.68 |
| Fe, ppm | 4.9 | 11.9 | 1.6 | <1.1 | 3.1 |

TABLE 1-continued

Properties of As-Received Oil and Wax from Pyrolysis of Waste Plastics

|  | Pyrolysis Oil Sample A | Pyrolysis Oil Sample B | Pyrolysis Oil Sample C | Pyrolysis Oil Sample D | Pyrolysis Wax Sample E |
|---|---|---|---|---|---|
| Mg, ppm | <0.51 | 1.3 | <0.52 | <0.53 | <0.68 |
| Na, ppm | 2.5 | <0.54 | <1.1 | <2.2 | <2.7 |
| Ni, ppm | <0.51 | <0.54 | <0.52 | 2 | <0.68 |
| V, ppm | <0.51 | <0.54 | <0.52 | 4 | <0.68 |
| P, ppm | 8.2 | 9.9 | <1.6 | <2.2 | 20.2 |
| Si, ppm | 82.5 | 49.6 | 13 | 17 | 3.1 |

ASTM D4052 method was used for specific gravity measurements. Simulated boiling point distribution curve was obtained using ASTM D2887 method. Carlo-Erba analysis for carbon and hydrogen was based on ASTM D5291 method. Bromine number measurement was based on ASTM D1159 method. Hydrocarbon-type analysis was done using a high resolution magnetic mass spectrometer using the magnet scanned from 40 to 500 Daltons. Total sulfur was determined using XRF per ASTM D2622 method. The nitrogen was determined using a modified ASTM D5762 method using chemiluminescence detection. The total chloride content was measured typically using combustion ion chromatography (CIC) instrument using modified ASTM 7359 method. The oxygen content in naphtha and distillate boiling range was estimated using GC by GC/MS measurements with electron ionization detector for m/Z range of 29-500. Trace metal and non-metal elements in oil were determined using inductively coupled plasma-atomic emission spectrometry (ICP-AES).

Industrial pyrolysis process of sorted plastics, sourced predominantly from polyethylene and polypropylene waste, produced quality hydrocarbon streams with specific gravity ranging 0.7 to 0.9, and a boiling range from 18 to 1100° F. as in pyrolysis oil or pyrolysis wax.

The pyrolysis product is rather pure hydrocarbon made of mostly carbon and hydrogen. The hydrogen to carbon molar ratio varies from 1.7 to near 2.0. The Bromine Number is in the range of 14 through 60 indicating varying degrees of unsaturation coming from olefins and aromatics. The aromatic content is in the range of 5 to 23 volume % with a higher severity unit producing more aromatics. Depending on the process conditions of the pyrolysis unit, the pyrolysis products show paraffinic content ranging from mid-20 vol. % to mid-50 vol. %. The pyrolysis product contains a substantial amount of olefins. Samples A and B, pyrolysis oil produced under more severe conditions such as higher pyrolysis temperature and/or longer residence time, contain higher aromatic and lower paraffinic components, resulting H/C molar ratio of around 1.7 and high Bromine Number of 50-60. Samples C and D were produced at less severe conditions, and the pyrolysis oils are more paraffinic, resulting H/C molar ratio of close to 2.0 and Bromine Number around 40. Sample E, pyrolysis wax, is mostly paraffinic, saturated hydrocarbon with a substantial amount of normal hydrocarbons (as opposed to branched hydrocarbons) with low Bromine Number of only 14.

EXAMPLE 2

Contaminants in Pyrolysis Oils and Micro Filtration to Remove Solids

Pyrolysis oils or wax products contain residual solids and other impurities that could negatively affect the performance of conversion units in a refinery. As received pyrolysis oil samples were vacuum filtered through 0.7 micron glass fiber filter paper to remove residual solids and the results are summarized in Table 2.

The residual solid content can be measured by the Heptane Insolubles test, ASTM D-3279 method. For chloride analysis, X-ray fluorescence (XRF) method was used.

TABLE 2

Impurity Removal of Pyrolysis Oil by Filtration

|  |  | As-Received Pyrolysis Oil Feed | Feed Pretreating Filtration with 0.7 Micron Filter | % Reduction of Impurities by Filtration |
|---|---|---|---|---|
| Example 2-1 | Heptane Insoluble Solids, ppm | 1200 | 57 | 95% |
|  | Contaminants Cl, ppm | 67 | 8.4 | 93% |
| Example 2-2 | Heptane Insoluble Solids, ppm | 3000 | 61 | 98% |
|  | Contaminants Cl, ppm | 125 | 8.5 | 93% |
| Example 2-3 | Heptane Insoluble Solids, ppm | 2400 | 33 | 99% |
|  | Contaminants Cl, ppm | 235 | 8.2 | 97% |
| Example 2-4 | Contaminants Cl, ppm | 2173 | 1375 | 37% |
| Example 2-5 | Contaminants Cl, ppm | 9.1 | 10.4 | 0% |

In the study, it was found that the pore size of the filter is important for impurity removal. When a 25 micron filter was used, the filter paper was plugged and the filtration of the three pyrolysis oils could not be completed. With a 0.7 micron filter, the filtration reduced the content of heptane insoluble solids by 90% or higher. The study indicated filtration with small pore size filter, for example 1.0 micron or less, such as the 0.7 micron filter used, is effective in removing residual solids. Surprisingly, the filtration also removed chloride impurities effectively (Examples 2-1 through 2-4), except one case (Example 2-5). The data suggests that a pyrolysis oil product contains varying amounts of inorganic chloride species and filtration can reduce the impurity level substantially. In Example 2-5, however, no reduction of chloride species was observed. This suggests that some chloride species are organic in nature and further treatment would be needed beyond the filtration process.

EXAMPLE 3

Pyrolysis Oil Pretreating by Filtration Followed by CaO/ZnO/Clay Metal Oxide Treatment As-received pyrolysis oil, Sample F, was filtered through a continuous filtration unit containing 0.5 micron nominal filter cartridge to prepare a filtered oil, Sample F-1. The samples were analyzed for general feedstock properties and impurities, as shown in Table 3.

TABLE 3

Impurity Removal of Pyrolysis Oil by Continuous Filtration

| | Feed Pre-Treating | | |
|---|---|---|---|
| | Pyrolysis Oil Sample F As-Received Pyrolysis Oil | Pyrolysis Oil Sample F-1 Filtration with 0.5 micron nominal filter | % Reduction of Impurities by Filtration |
| Heptane Insoluble Solids, ppm | ~2400 | 314 | 87% |
| Contaminants | | | |
| Total S, ppm | 67 | — | — |
| Total N, ppm | 212 | 165 | 22% |
| Total Cl, ppm | 2317 | 1848 | 20% |
| Trace Elemental Impurities | | | |
| Fe, ppm | 17.6 | 9.3 | 47% |
| P, ppm | 4.6 | 3.6 | 22% |
| Si, ppm | 36.4 | 24.4 | 33% |
| Specific Gravity at 60° F. | 0.7866 | 0.7857 | — |
| Bromine Number, g/100 g | — | 67 | — |
| Simulated Distillation, ° F. | | | |
| 0.5% (Initial Boiling Point) | — | 22 | — |
| 5% | — | 148 | — |
| 10% | — | 180 | — |
| 30% | — | 294 | — |
| 50% | — | 401 | — |
| 70% | — | 518 | — |
| 90% | — | 664 | — |
| 95% | — | 735 | — |
| 99% (Final Boiling Point) | — | 859 | — |

The continuous filtration unit with 0.5 micron nominal filter cartridge was effective and reduced the content of heptane insoluble solids by 87% to produce the filtered oil, Sample F-1, with 314 residual heptane insoluble solids. The filtration also removed a substantial amount of other impurities such as nitrogen, chloride, iron, phosphorus and silicon.

Sample F-1 was further treated by passing it through a fixed bed reactor containing metal oxide adsorbent made of CaO/ZnO/Clay. The metal oxide treating experiments were carried out at 600 psig reactor pressure and 1 LHSV flow, with the temperature varying from 200 to 400° F. 1500 SCF/BBL of hydrogen was fed to the reactor with the oil. The results are summarized below in Table 4.

TABLE 4

Treating of Pyrolysis Oil Feed (Sample F-1) with CaO/ZnO/Clay Metal Oxide for Impurity Removal

| | Example No. | | | |
|---|---|---|---|---|
| | Example 4-1 Base Case | Example 4-2 | Example 4-3 | Example 4-4 |
| | | Metal Oxide Treating Temperature, F. | | |
| Feed Pretreating | No treating | 200 | 300 | 400 |
| Impurities in Pyrolysis Oil, ppm | | | | |
| N, ppm | 165 | 98 | 106 | 99 |
| Cl, ppm | 1848 | 742 | 487 | 288 |
| Fe, ppm | 9.3 | 2.2 | 1.7 | <1.1 |
| P, ppm | 3.6 | <3 | 3.1 | 3.3 |
| Si, ppm | 24.4 | 23.4 | 23.7 | 19.9 |
| % Reduction of Impurities by Metal Oxide Treating | | | | |
| N, % | Base case | 41% | 36% | 40% |
| Cl, % | Base case | 60% | 74% | 84% |
| Fe, % | Base case | 76% | 82% | >88% |
| P, % | Base case | ~20% | 14% | 8% |
| Si, % | Base case | 4% | 3% | 18% |

The metal oxide treatment step removed a substantial amount of metal (Fe) and other non-metals (N, Cl, P, Si) that could negatively affect the performance of conversion units in a refinery. CaO and ZnO containing metal oxides were particularly effective for chloride and iron removal. The removal became more efficient at a higher temperature.

EXAMPLE 4

Pyrolysis Oil Pretreating by Filtration Followed by NiO/MoO$_3$/PO$_4$/Alumina Metal Oxide Treatment As-received pyrolysis oil, Sample G, was filtered through a continuous filtration unit containing 0.5 micron nominal filter cartridge to prepare a filtered oil, Sample G-1. The samples were analyzed for general feedstock properties and impurities, as shown in Table 5.

TABLE 5

Impurity Removal of Pyrolysis Oil by Continuous Filtration

| | Feed Pre-Treating | | |
|---|---|---|---|
| | Pyrolysis Oil Sample G As-Received Pyrolysis Oil | Pyrolysis Oil Sample G-1 Filtration with 0.5 micron nominal filter | % Reduction of Impurities by Filtration |
| Contaminants | | | |
| Total S, ppm | 66 | 65 | 2% |
| Total N, ppm | 1490 | 1320 | 11% |
| Total Cl, ppm | 533 | 57 | 89% |
| Trace Elemental Impurities | | | |
| Ca, ppm | 58.1 | 4.9 | 92% |
| Cr, ppm | 9.1 | 7.8 | 14% |
| Fe, ppm | 29.0 | 13.8 | 52% |
| Mg, ppm | 2.9 | 0.7 | 75% |
| P, ppm | 18.0 | 18.1 | −1% |
| Si, ppm | 25.8 | 21.5 | 17% |
| Specific Gravity at 60° F. | — | 0.8481 | — |
| Bromine Number, g/100 g | — | 36 | — |

TABLE 5-continued

Impurity Removal of Pyrolysis Oil by Continuous Filtration

| | Feed Pre-Treating | | |
|---|---|---|---|
| | Pyrolysis Oil Sample G As-Received Pyrolysis Oil | Pyrolysis Oil Sample G-1 Filtration with 0.5 micron nominal filter | % Reduction of Impurities by Filtration |
| Simulated Distillation, ° F. | | | |
| 0.5% (Initial Boiling Point) | — | 324 | — |
| 5% | — | 473 | — |
| 10% | — | 531 | — |
| 30% | — | 625 | — |
| 50% | — | 691 | — |
| 70% | — | 766 | — |
| 90% | — | 936 | — |
| 95% | — | 1029 | — |
| 99% (Final Boiling Point) | — | 1161 | — |

The data in Table 5 show that the continuous filtration unit with 0.5 micron nominal filter cartridge was effective in reducing impurities such as nitrogen, chloride, calcium, chrome, iron, magnesium and silicon. However, the filtration did not remove any sulfur and phosphorus impurities.

Sample G-1 was further treated by passing it through a fixed bed reactor containing metal oxide adsorbent made of NiO/MoO$_3$/PO$_4$/Alumina. The metal oxide treating experiments were carried out at 400 psig reactor pressure and 1 LHSV flow, with the temperature varying from 500 to 550° F. 1500 SCF/BBL of hydrogen was fed to the reactor with the oil. The results are summarized below in Table 6.

TABLE 6

Treating of Pyrolysis Oil (Sample G-1) with NiO/MoO$_3$/PO$_4$/Alumina Metal Oxide for Impurity Removal

| | Example No. | | |
|---|---|---|---|
| | Example 4-1 Base Case | Example 4-2 | Example 4-3 |
| | | Metal Oxide Treating Temperature, ° F. | |
| Feed Pretreating | No treating | 500 | 550 |
| Bromine Number, g/100 g | 36 | 33 | 31 |

TABLE 6-continued

Treating of Pyrolysis Oil (Sample G-1) with NiO/MoO$_3$/PO$_4$/Alumina Metal Oxide for Impurity Removal

| | Example No. | | |
|---|---|---|---|
| | Example 4-1 Base Case | Example 4-2 | Example 4-3 |
| | | Metal Oxide Treating Temperature, ° F. | |
| Feed Pretreating | No treating | 500 | 550 |
| Impurities in Pyrolysis Oil, ppm | | | |
| N, ppm | 1320 | 1090 | 1050 |
| Cl, ppm | 57 | 5.1 | <5 |
| Ca, ppm | 4.9 | <0.51 | <0.52 |
| Cr, ppm | 7.8 | 2.1 | 0.75 |
| Fe, ppm | 13.8 | 5.4 | 5.4 |
| Mg, ppm | 0.7 | <0.51 | <0.52 |
| P, ppm | 18.1 | 15.7 | 15.4 |
| Si, ppm | 21.5 | 16.0 | 14.2 |
| % Reduction of Impurities by Metal Oxide Treating | | | |
| N, % | Base case | 17% | 20% |
| Cl, % | Base case | 91% | >90% |
| Ca, % | Base case | >90% | >90% |
| Cr, % | Base case | 74% | 90% |
| Fe, % | Base case | 61% | 61% |
| Mg, % | Base case | >30% | >30% |
| P, % | Base case | 13% | 15% |
| Si, % | Base case | 26% | 34% |

The metal oxide treatment step removed a substantial amount of metals (Fe, Ca, Cr, Mg) and other non-metals (N, Cl, P, Si) that could negatively affect the performance of conversion units in a refinery. MoO$_3$ and NiO containing metal oxides were particularly effective for metals removal at about 500-550° F.

The following Examples 5 through 8 show the evaluation of waste plastics pyrolysis oil for transportation fuel.

EXAMPLE 5

Fractionation of Pyrolysis Oil for Evaluation as Transportation Fuel

Sample D was distilled to produce hydrocarbon cuts representing gasoline (350° F.$^-$), jet (350-572° F.), diesel (572-700° F.) and the heavy (700° F.$^+$) fractions. Table 7 summarizes the boiling point distribution and impurity distributions among the distilled product fractions.

TABLE 7

Distillation of Pyrolysis Oil into Fuel Fractions

| Sample ID | Sample D | Sample H | Sample I | Sample J | Sample K |
|---|---|---|---|---|---|
| Intended Fraction | | Gasoline Cut | Jet Cut | Diesel Cut | Unconverted |
| Cut Point Target, ° F. | | 350$^-$ | 350-572 | 572-700 | 700$^+$ |
| Distillation Actual Yields, wt % | | 37.2 | 38.0 | 15.0 | 9.3 |
| Simulated Distillation, F. | | | | | |
| IBP (0.5 wt %) | 86 | 27 | 299 | 539 | 640 |
| 5 wt % | 154 | 98 | 345 | 557 | 684 |
| 10 wt % | 210 | 147 | 365 | 574 | 696 |
| 30 wt % | 304 | 222 | 416 | 597 | 727 |
| 50 wt % | 421 | 270 | 457 | 619 | 758 |
| 70 wt % | 532 | 291 | 492 | 644 | 808 |
| 90 wt % | 676 | 337 | 546 | 674 | 898 |
| 95 wt % | 743 | 347 | 554 | 683 | 953 |
| FBP (99.5 wt %) | 888 | 385 | 591 | 711 | 1140 |
| Total S, ppm | 99 | 52 | 35 | 80 | 320 |

TABLE 7-continued

Distillation of Pyrolysis Oil into Fuel Fractions

| Sample ID | Sample D | Sample H | Sample I | Sample J | Sample K |
|---|---|---|---|---|---|
| Total N, ppm | 353 | 215 | 556 | 232 | 467 |
| Total Cl, ppm | 70 | 181 | 27 | 12 | 13 |

EXAMPLE 6

Evaluation of Pyrolysis Oil Cut for Gasoline Fuel

Sample H, a pyrolysis oil cut for gasoline fuel boiling range, was evaluated to assess its potential for use as a gasoline fuel. Sample H has the carbon number range of C5-C12, typical of a gasoline fuel.

Due to the olefinic nature of the pyrolysis oil, oxidation stability (ASTM D525) and gum forming tendency (ASTM D381) were identified as the most critical properties to examine. Research octane number (RON) and motor octane number (MON) are also the critical properties for engine performance. The RON and MON values were estimated from detailed hydrocarbon GC analysis.

TABLE 8

Evaluation of Pyrolysis Oil Naphtha Fraction for Gasoline Fuel

| | Oxidation Stability, min | Washed Gum, mg/ 100 mL | RON | MON |
|---|---|---|---|---|
| Sample H | 90 | 5.0 | 71.4 | 67.7 |
| Reference gasoline | >1440 | 1 | 95.8 | 86.2 |
| 4/96 vol. % Blend of Sample H with reference gasoline | >1440 | 2.0 | 94.5 | 85.1 |
| 15/85 vol. % Blend of Sample H with reference gasoline | >1440 | 2.2 | 91.8 | 83.1 |

Sample H, a pyrolysis oil cut for gasoline fuel boiling range, cannot be used by itself as automotive gasoline fuel due to its poor quality. The gasoline fraction from the pyrolysis oil showed very poor oxidation stability in that Sample H failed only after 90 min compared to the target stability of longer than 1440 minutes. The pyrolysis gasoline exceeded the wash gum target of 4 mg/100 mL suggesting severe gum forming tendency. The pyrolysis gasoline has poor octane numbers compared to the reference gasoline. A premium unleaded gasoline was used as the reference gasoline.

The potential of blending the pyrolysis gasoline cut in a limited amount with the reference gasoline was also examined. The study showed that possibly up to 15 volume % of Sample H can be blended with the refinery gasoline while still meeting the fuels property targets. By integrating the pyrolysis gasoline product with a refinery fuel, the overall product quality can be maintained.

These results indicate that the as-produced gasoline fraction of pyrolysis oil has limited utility as gasoline fuel. Upgrading in a refinery unit is needed to convert the gasoline fraction of the pyrolysis oil into a hydrocarbon that meets the gasoline fuel property targets.

EXAMPLE 7

Evaluation of Pyrolysis Oil Cut for Jet Fuel

Sample I, a pyrolysis oil cut for jet fuel boiling range, was evaluated to assess its potential for use as jet fuel. Sample I has the carbon number range of C9-C18, typical of the jet fuel.

Due to the olefinic nature of the pyrolysis oil, jet fuel thermal oxidation test (D3241) was considered as an important test. The pyrolysis oil jet cut as-is, Sample I, had only 36 minutes of oxidation stability, suggesting that the pure pyrolysis jet cut is unsuitable for use as jet fuel.

A 5 volume % blend of pyrolysis jet cut (Sample I) with refinery produced jet was prepared. The blend still failed the jet fuel oxidation test as shown in Table 9.

TABLE 9

Evaluation of Pyrolysis Oil Jet Fraction for Jet Fuel

| | Jet Fuel Thermal Oxidation Test |
|---|---|
| Reference jet fuel | Passed |
| 5/95 vol. % Blend of Sample I with reference jet fuel | Failed |

These results indicate that the as-produced jet fraction of pyrolysis oil is completely unsuitable for jet fuel, and upgrading in a refinery unit is required to convert this jet fraction of the pyrolysis oil into a hydrocarbon that meets the jet fuel property targets.

EXAMPLE 8

Evaluation of Pyrolysis Oil Cut for Diesel Fuel

Sample J, a pyrolysis oil cut for diesel fuel boiling range, was evaluated to assess its potential for use as diesel fuel. Sample J has the carbon number range of C14-C24, typical of a diesel fuel.

Sample J contains a substantial amount of normal hydrocarbons. Since normal hydrocarbons tend to exhibit waxy characteristics, cold flow properties such as pour point (ASTM D5950-14) and cloud points (ASTM D5773) were considered as the most critical tests.

Two blends were prepared at 10 and 20 volume % of Sample J with refinery produced diesel fuel. However, both blends still failed the target pour point of less than −17.8° C. (0° F.) pour points.

TABLE 10

Evaluation of Pyrolysis Oil Diesel Fraction for Diesel Fuel

| | Cloud Point (° C.) | Pour Point (° C.) | Pour Point Test |
|---|---|---|---|
| Reference diesel fuel | −17.1 | −19.0 | Passed |
| 10/90 vol. % Blend of Sample J with reference diesel fuel | −11.1 | −12.0 | Failed |
| 20/80 vol. % Blend of Sample J with reference diesel fuel | −5.5 | −7.0 | Failed |

These results indicate that the pyrolysis oil as-is is completely unsuitable for diesel fuel, and upgrading in a refinery unit is required to covert the diesel fraction of pyrolysis oil into hydrocarbon that meets the diesel fuel property targets.

EXAMPLE 9

Coprocessing of Pyrolysis Product to FCC Unit

By feeding the entire pyrolysis feedstock to a FCC unit after the feed pretreating as shown in FIG. 3, the pyrolysis oil and wax are converted into offgas, LPG paraffins and olefins, FCC gasoline and heavy hydrocarbon components. The FCC gasoline is a valuable gasoline blending component. The heavy fractions, light cycle oil (LCO) and heavy cycle oil (HCO) are converted further in the subsequent conversion units including jet hydrotreating unit, diesel hydrotreating unit, hydrocracking unit and/or coker unit to make more gasoline, jet, and diesel fuel with satisfactory product properties. The LPG paraffins and olefins can be either processed further in an alkylation unit or in part used for petrochemicals production with a recycle content.

The following Examples 10 and 11 demonstrate the conversion of waste plastics pyrolysis product into quality transportation fuel in a refinery conversion unit, using a FCC unit as an example.

EXAMPLE 10

Conversion of Pyrolysis Oil in FCC

To study the impact of coprocessing of waste plastics pyrolysis oil in a FCC, a series of laboratory tests were carried out with Samples A and C. Vacuum gas oil (VGO) is the typical feed for FCC. FCC performances of 20 volume % blend of pyrolysis oil with VGO and pure pyrolysis oil were compared with that of the pure VGO feed.

The FCC experiments were carried out on a Model C ACE (advanced cracking evaluation) unit fabricated by Kayser Technology Inc. using regenerated equilibrium catalyst (Ecat) from a refinery. The reactor was a fixed fluidized reactor using $N_2$ as a fluidization gas. Catalytic cracking experiments were carried out at the atmospheric pressure and 900° F. reactor temperature. The cat/oil ratio was varied between 5 to 8 by varying the amount of the catalyst. A gas product was collected and analyzed using a refinery gas analyzer (RGA), equipped with GC with FID detector. In-situ regeneration of a spent catalyst was carried out in the presence of air at 1300° F., and the regeneration flue gas was passed through a LECO unit to determine the coke yield. A liquid product was weighted and analyzed in a GC for simulated distillation (D2887) and $C_5^-$ composition analysis. With a material balance, the yields of coke, dry gas components, LPG components, gasoline (C5-430° F.), light cycle oil (LCO, 430-650° F.) and heavy cycle oil (HCO, 650° F.$^+$) were determined. The results are summarized below in Table 11.

TABLE 11

Evaluation of Pyrolysis Oil Cofeeding to FCC

| | Feed | | | | |
|---|---|---|---|---|---|
| | 100% VGO | 20/80 vol % blend, Sample A/VGO | 20/80 vol % blend, Sample C/VGO | 100% Sample A | 100% Sample C |
| Cat/Oil, wt/wt | 6.0 | 6.0 | 6.0 | 6.0 | 6.0 |
| Conversion, wt %* | 81.3 | 83.15 | 83.09 | 76.1 | 78.82 |
| WLP Impurity** | | | | | |
| Total O, ppm | 81 | 76 | 62 | 54 | 67 |
| Total N, ppm | 27 | 30 | 33 | 50 | 21 |

TABLE 11-continued

Evaluation of Pyrolysis Oil Cofeeding to FCC

| | Feed | | | | |
|---|---|---|---|---|---|
| | 100% VGO | 20/80 vol % blend, Sample A/VGO | 20/80 vol % blend, Sample C/VGO | 100% Sample A | 100% Sample C |
| Yields | | | | | |
| Coke, wt % | 4.45 | 4.35 | 4.20 | 3.56 | 2.90 |
| Total Dry Gas, wt % | 2.08 | 1.96 | 1.93 | 1.55 | 1.43 |
| Hydrogen | 0.16 | 0.12 | 0.12 | 0.05 | 0.04 |
| Methane | 0.68 | 0.65 | 0.64 | 0.50 | 0.46 |
| Ethane | 0.44 | 0.43 | 0.41 | 0.33 | 0.28 |
| Ethylene | 0.76 | 0.74 | 0.72 | 0.63 | 0.61 |
| Total LPG, wt % | 21.25 | 21.08 | 21.50 | 20.17 | 24.40 |
| Propane | 1.78 | 1.76 | 1.72 | 1.47 | 1.53 |
| Propylene | 5.53 | 5.51 | 5.56 | 5.57 | 6.75 |
| n-Butane | 1.56 | 1.56 | 1.54 | 1.29 | 1.34 |
| Isobutane | 6.61 | 6.48 | 6.64 | 5.43 | 6.61 |
| C4 olefins | 5.77 | 5.77 | 6.04 | 6.41 | 8.16 |
| Gasoline, wt % | 53.53 | 55.75 | 55.46 | 62.53 | 61.75 |
| LCO, wt % | 12.89 | 12.23 | 11.93 | 10.37 | 8.03 |
| HCO, wt % | 5.81 | 4.63 | 4.98 | 1.82 | 1.50 |
| Octane Number*** | 88.05 | 84.57 | 82.79 | 73.75 | 75.41 |

*Conversion—conversion of 430° F.$^+$ fraction to 430° F.$^-$
**Impurity level of N and O in whole liquid product in fuels boiling range by GC × GC, ppm
***Octane number, (R + M)/2, was estimated from detailed hydrocarbon GC of FCC gasoline.

The results in Table 11 show that up to 20 volume % cofeeding of pyrolysis oil only makes very slight changes in the FCC unit performance indicating coprocessing of pyrolysis oil up to 20% is readily feasible. The 20 volume % blending of Sample A or Sample C led to very slight reduction of coke and dry gas yields, slight increase in gasoline yield and slight decrease in LCO and HCO, which are favorable in most situations. With paraffinic nature of pyrolysis oil, the 20% blends of A and C lowered the Octane number by about 3-5 numbers. With refinery operational flexibility, these octane number debits can be compensated with blending or feeding location adjustments.

The FCC unit cracks the pyrolysis oil info fuel range hydrocarbons, reduces impurities, and isomerize n-paraffins to isoparaffins. All these chemistry will improve the fuel properties of the pyrolysis oil and wax. By cofeeding the pyrolysis oil through the FCC process unit with a zeolite catalyst, the oxygen and nitrogen impurities in the fuel range were reduced substantially, from about 300-1400 ppm N to about 30 ppm N and from about 250-540 ppm O to about 60-80 ppm O. The hydrocarbon composition of all these cofeeding products are well within the typical FCC gasoline range.

The FCC runs of 100% pyrolysis oil showed substantial debits of Octane numbers by about 13-14 numbers. This shows that coprocessing of pyrolysis oil is preferred over processing of pure 100% pyrolysis oil.

EXAMPLE 11

Coprocessing of Pyrolysis Wax in a FCC

To study the impact of coprocessing of waste plastics pyrolysis wax in a FCC, a series of laboratory tests were carried out with Sample E and VGO. FCC performances of 20% blend of pyrolysis wax with VGO and pure pyrolysis wax were compared with that of the pure VGO feed, similar to Example 10. The results are summarized below in Table 12.

TABLE 12

Evaluation of Pyrolysis Wax Cofeeding to FCC

| | Feed | | |
|---|---|---|---|
| | 100% VGO | 20/80 vol % blend, Sample E/VGO | 100% Sample E |
| Cat/Oil, wt/wt | 6.5 | 6.5 | 6.5 |
| Conversion, wt %* | 82.75 | 84.17 | 91.31 |
| Yields | | | |
| Coke, wt % | 4.78 | 4.76 | 4.26 |
| Total Dry Gas, wt % | 2.11 | 2.05 | 1.79 |
| Hydrogen | 0.16 | 0.14 | 0.07 |
| Methane | 0.69 | 0.67 | 0.58 |
| Ethane | 0.44 | 0.43 | 0.37 |
| Ethylene | 0.78 | 0.77 | 0.73 |
| Total LPG, wt % | 21.71 | 23.15 | 31.79 |
| Propane | 1.87 | 1.93 | 2.28 |
| Propylene | 5.54 | 5.98 | 8.59 |
| n-Butane | 1.65 | 1.74 | 2.15 |
| Isobutane | 6.91 | 7.25 | 8.88 |
| C4 olefins | 5.74 | 6.25 | 9.89 |
| Gasoline, wt % | 54.16 | 54.21 | 53.47 |
| LCO, wt % | 12.42 | 11.59 | 6.71 |
| HCO, wt % | 4.83 | 4.24 | 1.99 |
| Octane Number** | 89.95 | 88.38 | 83.52 |

*Conversion—conversion of 430° F.⁺ fraction to 430° F.⁻
**Octane number, (R + M)/2, was estimated from detailed hydrocarbon GC of FCC gasoline.

The results in Table 12 shows that up to 20 volume % cofeeding of pyrolysis wax only makes very slight changes in the FCC unit performance indicating coprocessing of pyrolysis wax up to 20% is readily feasible. The 20 volume % blending of Sample E led to very slight reduction to no change of coke and dry gas yields, noticeable increase in LPG olefin yield, very slight increase in gasoline yield and slight decrease in LCO and HCO, which are all favorable in most situations. With paraffinic nature of pyrolysis wax, the 20% blend of Sample E lowered the Octane number slightly by 1.5 number. With refinery blending flexibility, this octane number debit can be easily compensated with minor blending adjustments.

The FCC run of 100% pyrolysis wax showed substantial increase in conversion, and debit of the Octane number by 6. This shows that coprocessing of pyrolysis wax is preferred over processing of 100% pyrolysis wax.

EXAMPLE 12

Feeding of Recycled C3 for Propylene Isolation or Production, Followed by Productions of Polypropylene Resin and Polypropylene Consumer Products The pyrolysis product cofeeding to a FCC unit, as shown in Examples 10 and 11 produces a substantial amount of $C_3$ LPG steam with a recycle content. The $C_3$ stream is a good feedstock to feed to a polymerization unit for production of polypropylene polymer with a recycle content. To achieve this, the $C_3$ LPG steam containing propane and propylene is captured and fed to a propane/propylene (P/P) splitter to isolate a pure propylene steam (>99 mol %), which is then fed to a propylene polymerization unit. The propane from the P/P splitter may be dehydrogenated to produce additional propylene for the polymerization unit.

The polypropylene resin containing some recycled-polyethylene/polypropylene derived materials is of high quality and is indistinguishable from that of a virgin polypropylene resin made entirely from virgin petroleum resources. The polypropylene resin with the recycled material can then be further processed to produce various polypropylene products to fit the needs of consumer products. These polypropylene consumer products now contain chemically recycled, circular polymer while qualities of the polypropylene consumer products are indistinguishable from those made entirely from virgin polypropylene polymer. These chemically recycled polymer products are different from the mechanically recycled polymer products whose qualities are inferior to the polymer products made from virgin polymers.

EXAMPLE 13

Quality Gasoline, Jet and Diesel Product Production with Recycle Content

Cofeeding of pyrolysis oil and/or wax to a FCC unit, as shown in Examples 10 and 11, produces a substantial amount of $C_3$-$C_5$ olefins with a recycle content, as well as the gasoline, jet, diesel products. The $C_4$ only or $C_4$-$C_5$ stream containing recycled olefins is separated from FCC light-end recovery units, and then fed to an alkylation unit. Reaction of LPG olefins and isobutane in the alkylation reactor produces n-butane and alkylate gasoline with recycle contents. Alkylate gasoline and n-butane are valuable gasoline blending components. The heavy fraction is further upgraded in a hydrocracking unit to produce quality gasoline, jet and diesel products.

The foregoing together clearly showed a new effective way to recycle a large quantity of polyethylene and polypropylene derived waste plastics via chemical recycling through pyrolysis followed by cofeeding of the pyrolysis products in a refinery via efficient integration. The examples also demonstrate the benefits of a filtration/metal oxide treatment prior to an FCC unit. This integration allows quality fuels and circular polymer productions.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

What is claimed is:
1. A continuous process for converting waste plastic into recycle for polypropylene polymerization comprising:
   (a) selecting waste plastics containing polyethylene and/or polypropylene;

(b) passing the waste plastics from (a) through a pyrolysis reactor to thermally crack at least a portion of the polyolefin waste and produce a pyrolyzed effluent;

(c) separating the pyrolyzed effluent into offgas, a pyrolysis oil comprising a naphtha/diesel/heavy fraction, and char;

(d) passing the pyrolysis oil from (c) to a filtration unit followed by a metal oxide treatment;

(e) recovering the treated pyrolysis oil from the metal oxide treatment and passing same to a refinery FCC unit;

(f) recovering a liquid petroleum $C_3$ olefin/paraffin mixture fraction from the FCC unit;

(g) separating the $C_3$ paraffin and $C_3$ olefin into different fractions; and (h) passing the $C_3$ olefin to a propylene polymerization reactor.

2. The process of claim 1, further comprising passing the $C_3$ paraffin to a dehydrogenation unit to produce $C_3$ olefin and then passing the $C_3$ olefin to a propylene polymerization reactor.

3. The process of claim 1, wherein a gasoline and heavy fraction are recovered from the refinery FCC unit.

4. The process of claim 1, wherein consumer polypropylene products are prepared from the polymerized propylene.

5. The process of claim 1, wherein the amount of gasoline produced by the FCC unit is increased due to the treated pyrolysis oil passed to the FCC unit in (e).

6. The process of claim 1, wherein the waste plastics selected in (a) are from plastics classification group 2, 4, and/or 5.

7. The process of claim 1, wherein the filtration employs a filter having pores averaging 5 microns or less in diameter.

8. The process of claim 7, wherein the pores average less than 1 micron in diameter.

9. The process of claim 1, wherein the metal oxide treatment comprises a metal oxide selected from CaO, ZnO, MgO, NiO, $MoO_3$, alumina, silica, silica-alumina, clay or a mixture thereof.

10. The process of claim 1, wherein the metal oxide treatment occurs at a temperature above 200° F.

11. The process of claim 1, wherein the filtration and metal oxide treatment occur in a refinery comprising the FCC unit.

12. The process of claim 1, wherein filtration occurs at a pyrolysis facility and the metal oxide treatment occurs at a refinery comprising the FCC unit.

13. The process of claim 1, wherein the content of heptane insolubles is reduced to less than 0.1 wt. % after the filtration treatment.

14. The process of claim 1, wherein the chloride content is reduced to less 5 ppm after the metal oxide treatment.

15. The process of claim 1, wherein the total metal impurity is less than 10 ppm after the metal oxide treatment.

16. The process of claim 1, wherein solid particulate and chloride reduction is achieved in the filtration and metal oxide treatment of (d), and S, diene, olefin, and N reduction is achieved by the refinery FCC unit.

17. The process of claim 1, wherein only the diesel and heavy fractions of the pyrolysis oil, or the heavy fraction of the pyrolysis oil is passed to a filtration and metal oxide treatment.

18. The process of claim 1, wherein the filtration unit employs a filter having pores averaging 5 microns or less in diameter, and the metal oxide treatment comprises a metal oxide selected from CaO, ZnO, MgO, NiO, $MoO_3$, alumina, silica, silica-alumina, clay or a mixture thereof.

19. A continuous process for converting waste plastic into recycle for polypropylene polymerization comprising:

(a) selecting waste plastics containing polyethylene and/or polypropylene;

(b) passing the waste plastics from (a) through a pyrolysis reactor to thermally crack at least a portion of the polyolefin waste and produce a pyrolyzed effluent;

(c) separating the pyrolyzed effluent into offgas, a pyrolysis oil comprising a naphtha/distillate/heavy fraction, and char;

(d) passing the pyrolysis oil from (c) to a filtration unit followed by a metal oxide treatment;

(e) recovering the treated pyrolysis oil from the metal oxide treatment and passing same to a refinery FCC feed pretreatment unit;

(f) recovering effluent from the FCC pretreatment unit and passing the effluent to a FCC unit;

(g) recovering a liquid petroleum $C_3$ olefin/paraffin mixture fraction from the FCC unit;

(h) separating the $C_3$ paraffin and $C_3$ olefin into different fractions; and (h) passing the $C_3$ olefin to a propylene polymerization reactor.

20. The process of claim 19, further comprising passing the $C_3$ paraffin to a dehydrogenation unit to produce $C_3$ olefin and passing the $C_3$ olefin to a propylene polymerization reactor.

21. The process of claim 19, wherein a gasoline and heavy fraction are recovered from the refinery FCC unit.

22. The process of claim 19, wherein consumer polypropylene products are prepared from the polymerized propylene.

23. The process of claim 19, wherein the amount of gasoline produced by the FCC unit is increased due to the treated pyrolysis oil passed to the FCC unit in (e).

24. The process of claim 19, wherein the waste plastics selected in (a) are from plastics classification group 2, 4, and/or 5.

25. The process of claim 19, wherein the filtration employs a filter having pores averaging 5 microns or less in diameter.

26. The process of claim 25, wherein the pores average less than 1 micron in diameter.

27. The process of claim 19, wherein the metal oxide treatment comprises a metal oxide selected from CaO, ZnO, MgO, NiO, $MoO_3$, alumina, silica or silica-alumina, or clay or a mixture thereof.

28. The process of claim 19, wherein the metal oxide treatment occurs at a temperature above 200° F. (93° C.).

29. The process of claim 19, wherein the filtration and metal oxide treatment occur in a refinery comprising the FCC unit.

30. The process of claim 19, wherein filtration occurs at a pyrolysis facility and the metal oxide treatment occurs at a refinery comprising the FCC unit.

31. The process of claim 19, wherein the content of heptane insolubles is reduced to less than 0.1 wt. % after the filtration treatment.

32. The process of claim 19, wherein the chloride content is reduced to less 5 ppm after the metal oxide treatment.

33. The process of claim 19, wherein the total impurity metal content is less than 10 ppm after the metal oxide treatment.

34. The process of claim 19, wherein solid particulate and chloride reduction is achieved in the filtration and metal oxide treatment of (d), and S, diene, olefin, and N reduction is achieved by the refinery FCC feed pretreatment unit.

35. The process of claim 19, wherein the filtration unit employs a filter having pores averaging 5 microns or less in diameter, and the metal oxide treatment comprises a metal oxide selected from CaO, ZnO, MgO, NiO, $MoO_3$, alumina, silica, silica-alumina, clay or a mixture thereof.

36. The process of claim 19, wherein only the diesel and heavy fractions of the pyrolysis oil, or the heavy fraction of the pyrolysis oil is passed to a filtration and metal oxide treatment.

37. A continuous process for converting waste plastic into recycle for polypropylene polymerization comprising:
   (a) selecting waste plastics containing polyethylene and/or polypropylene;
   (b) passing the waste plastics from (a) through a pyrolysis reactor to thermally crack at least a portion of the polyolefin waste and produce a pyrolyzed effluent;
   (c) separating the pyrolyzed effluent into offgas, a pyrolysis oil comprising a naphtha/diesel/heavy fraction, and char;
   (d) passing the pyrolysis oil from (c) to a filtration unit followed by a metal oxide treatment; and
   (e) recovering the treated pyrolysis oil from the metal oxide treatment and forwarding same to a refinery for propylene polymerization.

38. The process of claim 37, wherein the filtration employs a filter having pores averaging 5 microns or less in diameter.

39. The process of claim 38, wherein the pores average less than 1 micron in diameter.

40. The process of claim 37, wherein the metal oxide treatment comprises a metal oxide selected from CaO, ZnO, MgO, alumina Silica or silica-alumina, or a mixture thereof.

41. The process of claim 37, wherein the metal oxide treatment occurs at a temperature above 200° F. (93° C.).

42. The process of claim 37, wherein the content of heptane insolubles is reduced to less than 0.1 wt. % after the filtration treatment.

43. The process of claim 37, wherein the chloride content is reduced to less 5 ppm after the metal oxide treatment.

44. The process of claim 37, wherein the total metal impurity is less than 10 ppm after the metal oxide treatment.

45. The process of claim 37, wherein filtration occurs at a pyrolysis facility and the metal oxide treatment occurs at a refinery comprising the FCC unit.

46. The process of claim 37, wherein the waste plastics selected in (a) are from plastics classification group 2, 4, and/or 5.

47. The process of claim 34, further comprising producing gasoline, jet fuel and/or diesel fuel in the refinery.

48. The process of claim 47, wherein a jet fuel product is produced in the refinery.

49. The process of claim 47, wherein gasoline is produced in the refinery.

50. The process of claim 47, wherein diesel fuel is produced in the refinery.

51. The process of claim 37, wherein the filtration unit employs a filter having pores averaging 5 microns or less in diameter, and the metal oxide treatment comprises a metal oxide selected from CaO, ZnO, MgO, NiO, $MoO_3$, alumina, silica, silica-alumina, clay or a mixture thereof.

* * * * *

UNITED STATES PATENT AND TRADEMARK OFFICE
CERTIFICATE OF CORRECTION

PATENT NO. : 11,359,147 B2
APPLICATION NO. : 17/237633
DATED : June 14, 2022
INVENTOR(S) : Timken It is certified that error appears in the above-identified patent and that said Letters Patent is hereby corrected as shown below:

In the Claims

Claim 14, Column 23, Line 52, replace "less 5 ppm" with --less than 5 ppm--

Claim 19, Column 24, Line 22, replace "(h) passing the C3 olefin" with --(i) passing the C3 olefin--

Claim 32, Column 24, Line 60, replace "less 5 ppm" with --less than 5 ppm--

Claim 43, Column 26, Line 7, replace "less 5 ppm" with --less than 5 ppm--

Signed and Sealed this
Fifteenth Day of November, 2022

Katherine Kelly Vidal
*Director of the United States Patent and Trademark Office*